(12) United States Patent
Shi

(10) Patent No.: US 9,104,226 B2
(45) Date of Patent: Aug. 11, 2015

(54) ROCKER BUTTON SWITCH DEVICE OF DOG LEASH

(71) Applicant: Fuyou Shi, Zhejiang (CN)

(72) Inventor: Fuyou Shi, Zhejiang (CN)

( * ) Notice: Subject to any disclaimer, the term of this patent is extended or adjusted under 35 U.S.C. 154(b) by 197 days.

(21) Appl. No.: 13/801,842

(22) Filed: Mar. 13, 2013

(65) Prior Publication Data

US 2014/0076096 A1 Mar. 20, 2014

(51) Int. Cl.
*A01K 27/00* (2006.01)
*G05G 1/04* (2006.01)

(52) U.S. Cl.
CPC .............. *G05G 1/04* (2013.01); *A01K 27/004* (2013.01); *Y10T 74/20588* (2015.01)

(58) Field of Classification Search
CPC .................................................. A01K 27/004
USPC ................ 119/794–798, 769, 772, 774, 792; 242/385, 385.3, 385.4, 396, 396.1, 242/396.2, 396.3, 396.4
See application file for complete search history.

(56) References Cited

U.S. PATENT DOCUMENTS

| | | | | |
|---|---|---|---|---|
| 4,013,858 | A | * | 3/1977 | Grebner et al. ............ 200/43.04 |
| 4,187,420 | A | * | 2/1980 | Piber .......................... 200/43.16 |
| RE30,273 | E | * | 5/1980 | Grebner et al. ............ 200/43.04 |
| 5,045,648 | A | * | 9/1991 | Fogleman, Sr. ............ 200/43.16 |
| 5,890,456 | A | * | 4/1999 | Tancrede ...................... 119/794 |
| 6,148,773 | A | * | 11/2000 | Bogdahn ....................... 119/796 |
| 6,276,071 | B1 | * | 8/2001 | Khachatoorian ............... 33/767 |
| 6,904,872 | B2 | * | 6/2005 | Muller .......................... 119/796 |
| 7,036,459 | B1 | * | 5/2006 | Mugford et al. ............. 119/796 |
| 7,040,257 | B2 | * | 5/2006 | Waxman et al. ............. 119/796 |
| 7,784,728 | B2 | * | 8/2010 | Shi .............................. 242/385.4 |
| D651,366 | S | * | 12/2011 | Fisher et al. ................. D30/153 |
| 8,201,964 | B2 | * | 6/2012 | Mattheis ....................... 362/184 |
| 8,479,688 | B2 | * | 7/2013 | Friedrichsen ................. 119/796 |
| 8,651,411 | B2 | * | 2/2014 | Wang ......................... 242/385.4 |
| 2003/0029388 | A1 | * | 2/2003 | Walter et al. ................. 119/772 |
| 2005/0103282 | A1 | * | 5/2005 | Huff et al. .................... 119/796 |
| 2008/0230015 | A1 | * | 9/2008 | Bleshoy ........................ 119/796 |
| 2009/0255486 | A1 | * | 10/2009 | Thompson et al. .......... 119/794 |
| 2011/0180017 | A1 | * | 7/2011 | Goldenberg ................. 119/796 |

\* cited by examiner

*Primary Examiner* — Monica Williams
*Assistant Examiner* — Morgan T Barlow

(57) ABSTRACT

A rocker button switch device of a dog leash includes: an outer shell, a line wheel, a button, a locking slider, an unlocking slider, and a translation slider, wherein the button is mounted in a corresponding groove on the outer shell, the button is a rocker button, and able to rotate about a rocker central axle, two ends of the button respectively contact the locking slider and the unlocking slider directly and slidingly, for driving the locking slider and the unlocking slider to move up and down, the translation slider includes a translation spring, the translation slider and the unlocking slider push each other by inclined plane sliding, and the translation slider and the locking slider are locked together via a buckle. The rocker button switch device of the dog leash is simple in movement, convenient to use, and stable in performance.

6 Claims, 5 Drawing Sheets

ROCKER BUTTON SWITCH DEVICE OF DOG LEASH

BACKGROUND OF THE PRESENT INVENTION

1. Field of Invention

The present invention relates to a dog leash, and more particularly to a rocker button switch device of a dog leash.

2. Description of Related Arts

A conventional dog leash is generally double-button controlled or single-button controlled. A double-button control switch has a disadvantage of complicated operation, and a single-button control switch has disadvantages of great parts wearing, instable using effects, etc.

SUMMARY OF THE PRESENT INVENTION

In view of insufficiencies of the existing technology, an object of the present invention is to provide a rocker button switch device of a dog leash, which is simple in structure, convenient to use and stable in performance.

The technical solution of the present invention is as follows.

A rocker button switch device of a dog leash comprises: an outer shell, a line wheel, a button, a locking slider, an unlocking slider, and a translation slider, the button is provided in a position of a corresponding groove on the outer shell, wherein the button is a rocker button, and able to rotate about a rocker central axle, two ends of the button respectively contact the locking slider and the unlocking slider directly and slidingly, and the two ends are able to drive the locking slider and the unlocking slider to move up and down, the translation slider comprises a translation spring, the translation slider and the unlocking slider push each other by inclined plane sliding, and the translation slider and the locking slider are locked together via a buckle.

According to the present invention, a boss on the translation slider is locked together with a surface of a boss of the locking slider via the buckle.

Each of the unlocking slider, the locking slider and the translation slider according to the present invention comprises a spring; when a front end of the rocker button is pressed down, the unlocking slider is pushed down; when the unlocking slider is moving down, the unlocking slider is sliding relative to the translation slider to push the translation slider to move; at this time, the translation slider and the locking slider are disengaged, and the locking slider is pushed by the spring to go away from the line wheel, in such a manner that the line wheel resumes rotating freely, and a dog rope is able to be pulled out freely; when a back end of the rocker button is pressed down, the locking slider is pushed down; when the locking slider is moving down, the translation slider is pushed by the spring to move attaching to the unlocking slider which is moving upward until being locked together with the locking slider via the buckle, in such a manner that the locking slider will not return when the rocker button is released, and the line wheel stops rotating to be fixed in a certain position.

A preferred embodiment of the present invention adopts the rocker button, through sliding cooperation of the translation slider, the unlocking slider and the locking slider, and locking via the buckle, the rock button switch device of the dog leash according to a preferred embodiment of the present invention is simple in movement, convenient to use, and stable in performance.

These and other objectives, features, and advantages of the present invention will become apparent from the following detailed description, the accompanying drawings, and the appended claims.

DETAILED DESCRIPTION OF THE PREFERRED EMBODIMENT

Figure 1:
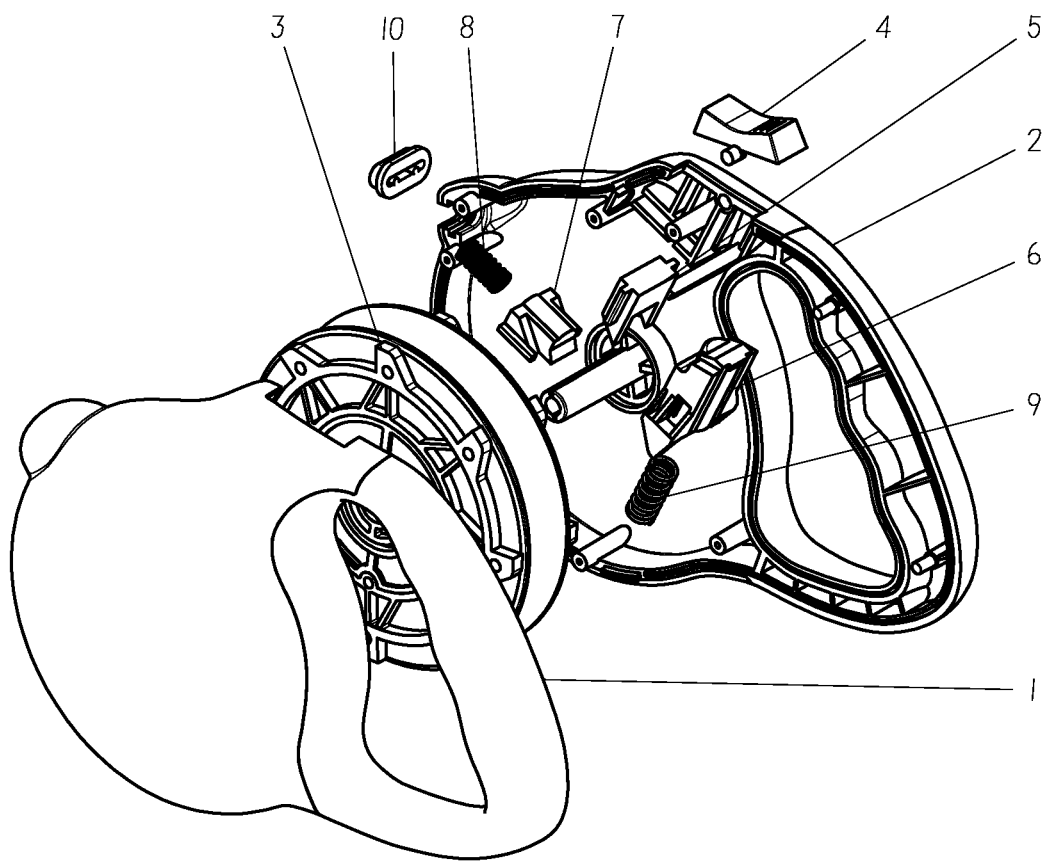
FIG. 1 is a perspective view of a rocker button switch device of a dog leash according to a preferred embodiment of the present invention.

Referring to a preferred embodiment as shown in FIG. 1, a rocker button switch device of a dog leash, according to a preferred embodiment of the present invention, comprises: a left shell 1, a right shell 2, a line wheel 3, a button 4, a locking slider 6, an unlocking slider 5, a translation slider 7, and a line outlet 10, wherein the button 4 is mounted in corresponding grooves on the left shell 1 and the right shell 2, the button 4 is a rocker button, able to rotate about a central axle, two ends of the button 4 are respectively in direct and sliding contact with the locking slider 6 and the unlocking slider 5, the two ends are able to drive the locking slider 6 and the unlocking slider 5 to move up and down, the translation slider 7 moves forward and backward under action of a translation spring 8, the translation slider 7 and the unlocking slider 5 push each other by inclined plane sliding, a boss on the translation slider 7 is locked together with a surface of a boss of the locking slider 6 via a buckle, and the unlocking slider 5 and the translation slider 7 intersect at an angle of almost 90 degrees.

The unlocking slider 5 and the locking slider 6, according to the preferred embodiment of the present invention, are only able to move up and down in limit grooves on the left shell 1 and the right shell 2, and the translation slider 7 is only able to move forward and backward in the limit grooves on the left shell 1 and the right shell 2.

Figure 2:
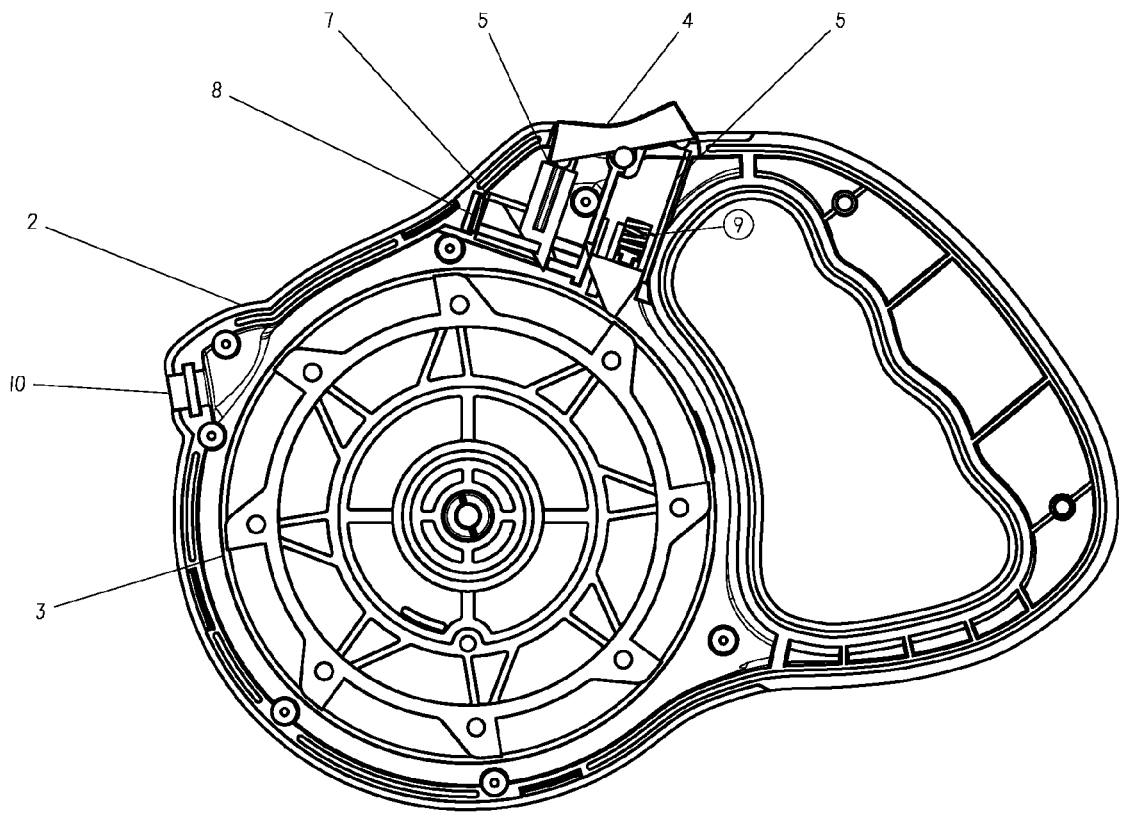
FIG. 2 is a structure sketch view of a rocker button in a state that the front end is pressed down according to the preferred embodiment of the present invention shown in FIG. 1.

Referring to FIG. 2, when a front end of the button 4 is pressed down, i.e., when a back end is raised up, the front end of the button 4 is in a press-down position simultaneously, the unlocking slider 5 is pushed down, the unlocking slider 5 and the translation slider 7 slide relatively, in such a manner that the unlocking slider 5 pushes the translation slider 7 to move forward, so as to disengage the translation slider 7 from the locking slider 6, and the translation slider 7 compresses a translation spring 8. Therefore, the locking slider 6 goes away from the line wheel 3 under the pushing of an inner spring 9, the line wheel 3 is able to rotate freely, and the dog rope (belt) is able to be recovered and paid off freely.

Figure 3:
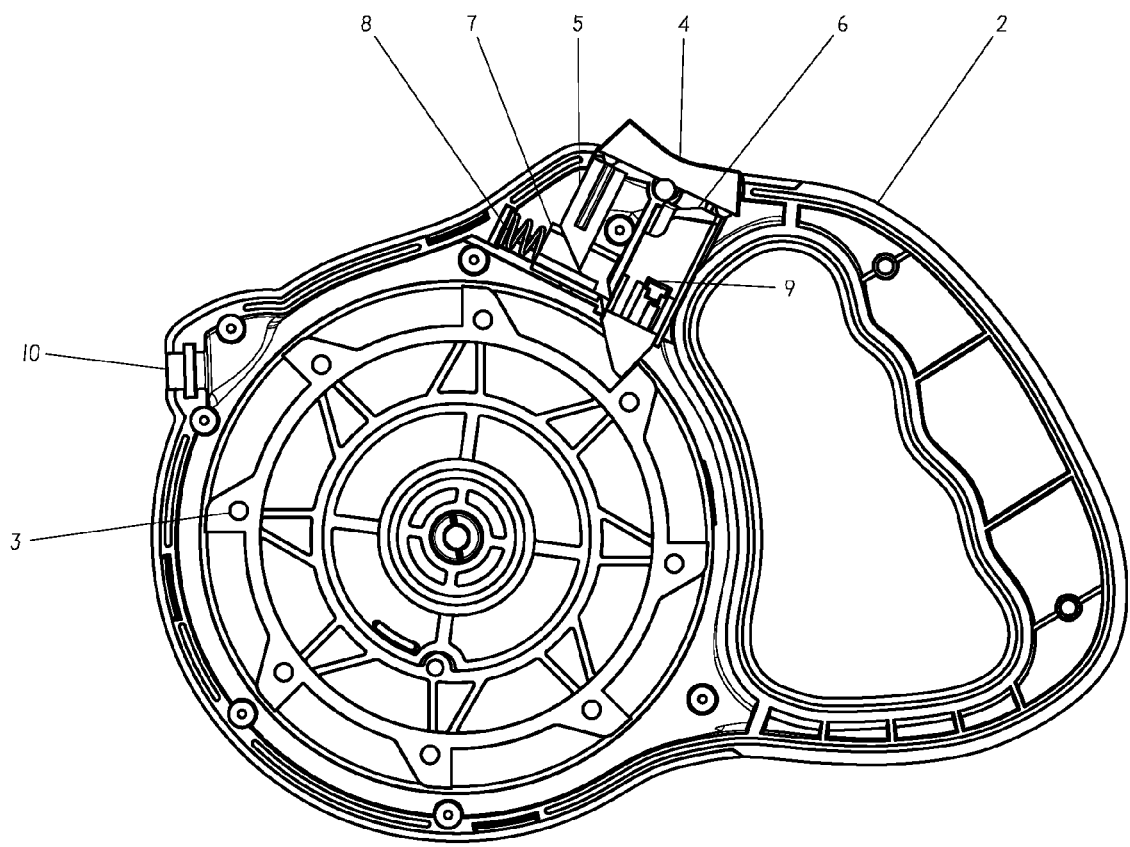
FIG. 3 is a structure sketch view of the rocker button in a state that the back end is pressed down according to the preferred embodiment of the present invention shown in FIG. 1.
Figure 4:
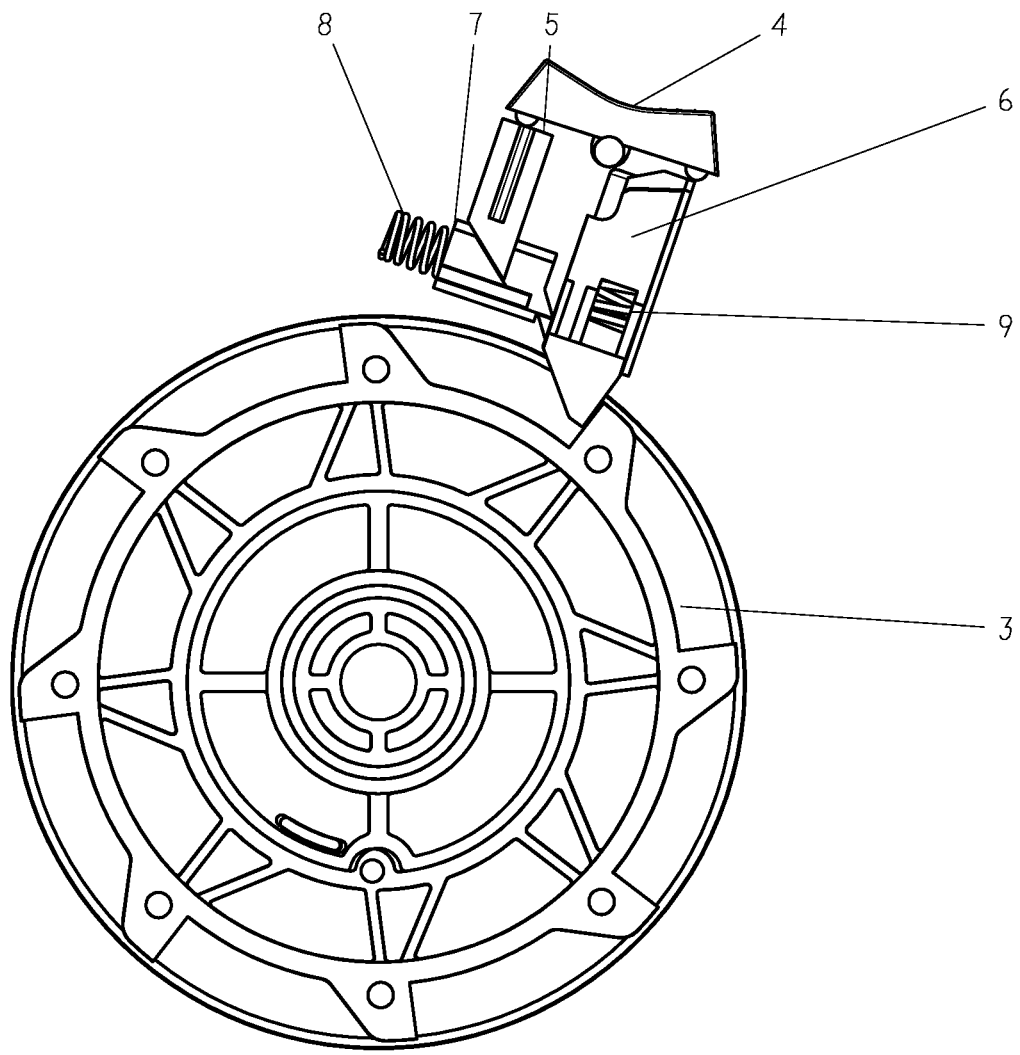
FIG. 4 is a structure view of the rocker button and a line wheel in a state of FIG. 3 according to the above preferred embodiment of the present invention.

Referring to FIG. 3 and FIG. 4, when the back end of the button 4 is pressed down, i.e., when the front end is raised up, the back end of the button 4 is in a press-down position, the locking slider 6 is pushed down against a force of the inner spring 9, the translation spring 8 pushes the translation slider 7 to move backward simultaneously, and the translation slider 7 pushes the unlocking slider 5 to move up by an inclined plane. When the button 4 is pressed down to a lower limit, the translation slider 7 and the boss of the locking slider 6 are in contact and rub slidingly, when the button 4 is pressed down to the lower limit, a tongue of the translation slider 7 is locked behind the boss of the locking slider 6, at this time, the button 4 is released, the locking slider 6 will not return, in such a manner that the locking slider 6 locks the line wheel 3 stably, the line wheel stops rotating, and a predetermined length of the dog rope is able to be determined to pull out.

Figure 5:
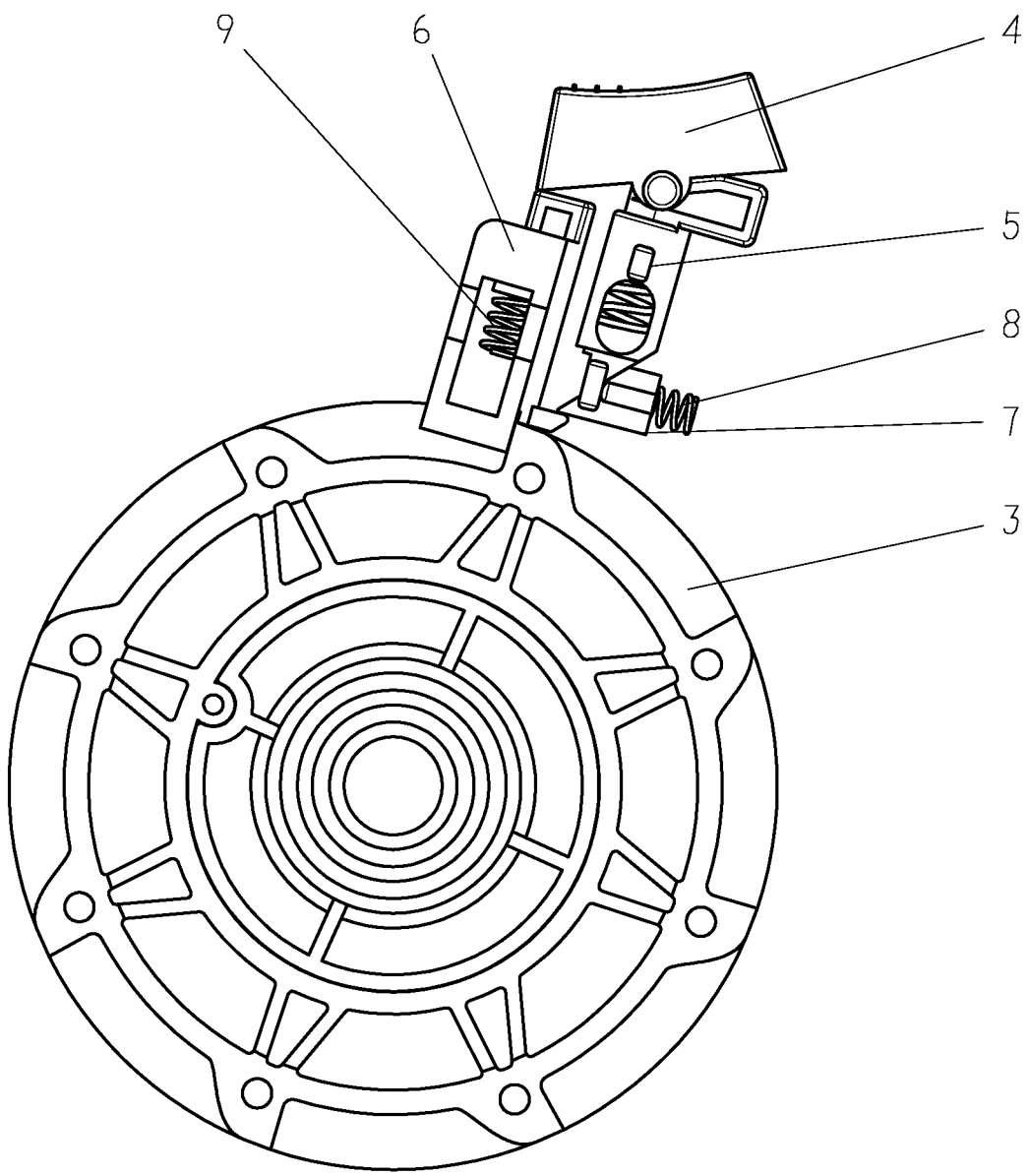
FIG. 5 is a structure sketch view of the rocker button switch device of the dog leash according to another preferred embodiment of the present invention. (The outer shell is hidden.)

According to the preferred embodiment shown in FIG. 1 to FIG. 4, when the front end of the button 4 is pressed down, the dog rope is able to be recovered and paid off freely, when the back end of the button 4 is pressed down, the line wheel stops rotating and the fixed length of the dog rope is able to be determined to pull out. FIG. 5 shows the rocker button switch device of the dog leash according to another preferred embodiment of the present invention, wherein the unlocking slider and the locking slider change places with each other, other structures don't change, in such a manner that when the front end of the button 4 is pressed down, the line wheel stops rotating and the fixed length of the dog rope is able to be determined to pull out, when the back end of the button 4 is pressed down, the dog rope is able to be recovered and paid off freely.

The translation spring according to the preferred embodiment of the present invention is an inner spring or an outer torsion spring.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rocker button switch device of a dog leash comprising: an outer shell, a line wheel, a button, a locking slider, an unlocking slider, and a translation slider, wherein said button is mounted in a position of a corresponding groove on said outer shell, said button is a rocker button, and able to rotate about a rocker central axle, two ends of said button respectively contact said locking slider and said unlocking slider directly and slidingly, for driving said locking slider and said unlocking slider to move up and down, said translation slider comprises a translation spring, said translation slider and said unlocking slider push each other by inclined plane sliding, said translation slider and said locking slider are locked together via a buckle;

wherein when a front end of said button is pressed down, a back end of said button is raised up; simultaneously, said unlocking slider is pushed down, said unlocking slider and said translation slider slide relatively, in such a manner that said unlocking slider pushes said translation slider to move forward, so as to disengage said translation slider from said locking slider, and said translation slider compresses said translation spring, in such manner that said locking slider goes away from said line wheel, and said line wheel is able to rotate freely;

wherein when said back end of said button is pressed down, said locking slider is pushed down against a force of an inner spring, said translation spring pushes said translation slider to move backward simultaneously, and said translation slider pushes said unlocking slider to move up; when said button is pressed down to a lower limit, said translation slider and said locking slider are in contact and rub slidingly, when said button is pressed down to said lower limit, said translation slider is locked by said locking slider, at this time, said button is released, said locking slider will not return, in such a manner that said locking slider locks said line wheel stably, said line wheel stops rotating.

2. The rocker button switch device of the dog leash, as recited in claim 1, wherein said translation slider further comprises a translation slider boss for locking a surface of a locking slider boss on said locking slider.

3. The rocker button switch device of the dog leash, as recited in claim 1, wherein said translation spring is an inner translation spring.

4. The rocker button switch device of the dog leash, as recited in claim 2, wherein said translation spring is an inner translation spring.

5. The rocker button switch device of the dog leash, as recited in claim 1, wherein said translation spring is an outer torsion spring.

6. The rocker button switch device of the dog leash, as recited in claim 2, wherein said translation spring is an outer torsion spring.

* * * * *